United States Patent
Kijimoto

(10) Patent No.: US 6,810,791 B2
(45) Date of Patent: Nov. 2, 2004

(54) PRESSURE FRYER

(75) Inventor: Hideki Kijimoto, Nagoya (JP)

(73) Assignee: Paloma Industries, Limited, Nagoya (JP)

( * ) Notice: Subject to any disclaimer, the term of this patent is extended or adjusted under 35 U.S.C. 154(b) by 0 days.

(21) Appl. No.: 10/790,154

(22) Filed: Mar. 1, 2004

(65) Prior Publication Data

US 2004/0177767 A1 Sep. 16, 2004

(30) Foreign Application Priority Data

Mar. 13, 2003 (JP) ........................................ 2003-068604

(51) Int. Cl.$^7$ ............................................... A47J 37/12
(52) U.S. Cl. .............................. 99/330; 99/331; 99/332; 99/337; 99/342; 99/403; 126/374.1; 126/391.1
(58) Field of Search ........................... 99/325–334, 337, 99/338, 342, 403–410; 126/391.1, 389.1, 390.1, 378.1, 374.1, 369; 210/167, DIG. 8; 219/492, 494, 497, 506, 508, 442, 486, 510; 426/512, 231–233, 438, 519, 523; 431/326.1, 170; 700/90, 99, 85, 300; 340/539; 705/14, 16; 709/219, 223, 203, 238

(56) References Cited

U.S. PATENT DOCUMENTS

| | | | |
|---|---|---|---|
| 4,599,990 A | * | 7/1986 | Fritzsche et al. ......... 126/374.1 |
| 4,623,544 A | * | 11/1986 | Highnote .................... 426/233 |
| 4,840,287 A | | 6/1989 | Brewer et al. |
| 4,911,068 A | | 3/1990 | Koether et al. |
| 4,928,664 A | * | 5/1990 | Nishino et al. ........... 126/391.1 |
| 4,930,408 A | | 6/1990 | King et al. |
| 4,947,824 A | * | 8/1990 | Ejiri et al. ................ 126/391.1 |
| 4,997,101 A | | 3/1991 | King et al. |
| 5,033,368 A | | 7/1991 | Brewer |
| 5,261,322 A | * | 11/1993 | Yokoyama et al. ........... 99/330 |
| 5,297,474 A | * | 3/1994 | Tabuchi ....................... 99/344 |
| 5,402,712 A | | 4/1995 | King et al. |
| 5,819,638 A | * | 10/1998 | Yokoyama ................... 99/330 |
| 5,974,955 A | | 11/1999 | King et al. |
| 6,009,795 A | | 1/2000 | Werts |
| 6,085,640 A | | 7/2000 | King |
| 6,105,488 A | | 8/2000 | King et al. |
| 6,112,646 A | | 9/2000 | King et al. |
| 6,131,564 A | * | 10/2000 | Song ........................ 126/391.1 |
| 6,269,806 B1 | * | 8/2001 | Dellarosa ..................... 99/337 |
| 6,336,395 B1 | | 1/2002 | Tiszai |
| 6,345,571 B2 | * | 2/2002 | Tateyama .................... 99/330 |
| 6,354,192 B2 | * | 3/2002 | Tateyama .................... 99/330 |
| 6,443,051 B1 | * | 9/2002 | Suzuki ........................ 99/330 |
| 6,470,794 B2 | * | 10/2002 | Takahashi .................... 99/408 |

* cited by examiner

Primary Examiner—Timothy F. Simone
(74) Attorney, Agent, or Firm—Burr & Brown

(57) ABSTRACT

Termination of cooking in a safe state can be judged without fail. At S5, a cooking timer according to a selected cooking menu is started and at S6 it is judged that the cooking timer finishes. Then, at S7 a burner controller stops heating by burners while a pressure valve is opened so that the pressured air in an oil vat can be released. Because of the release, when pressure in the oil vat 4 reaches a low value which is safe enough to release the lid, a second pressure switch with low set pressure is turned OFF. When it is confirmed that the second pressure switch is turned OFF at S8, a cooking controller 23 alarms a buzzer to notify termination of the cooking at S9.

4 Claims, 3 Drawing Sheets

PRESSURE FRYER

BACKGROUND OF THE INVENTION

This application claims the benefit of Japanese Patent Application Number 2003-68604 filed on Mar. 13, 2003, the entirety of which is incorporated by reference.

1. Field of the Invention

This invention relates to a pressure fryer which includes an oil vat for containing cooking oil, a heating means for heating the oil vat, and a lid which is able to hermetically seal the oil vat so as to cook foods such as fried chicken or fried potatoes with heat and pressure.

2. Description of the Related Art

A conventional pressure fryer includes an oil vat for containing cooking oil, a heating means for heating the cooking oil, such as a burner, a lid which is capable of sealing an opening of the oil vat when the oil vat is heated, a pressure releasing means for releasing the pressure in the oil vat, such as an open/close valve, and a controlling means for controlling the heating means and the pressure releasing means. With this structure, cooking oil in the oil vat is heated by operating the heating means according to a predetermined cooking menu in which a cooking temperature and a cooking timer is set. Whereby, foods put into the oil vat can be cooked with heat and pressure.

Moreover, when the cooking timer finishes, the controlling means stops the operation of the heating means while releasing the pressure in the oil vat using the pressure releasing means, so that the oil vat can be opened.

However, after the cooking timer finishes and the pressure starts to be released, it takes time to release the pressure in the oil vat completely. Due to this, steam or oil smoke could gush out by extra remaining pressure when a user opens the lid at the time of notification of time up. A cooking apparatus to solve the problem is disclosed, for example, in Japanese patent publication of unexamined application No. 1-274721. It includes first register means for storing timing information relating to a cooking process following a cooking control program and means for decrementing the first register means as the cooking process continues. It also includes second register means for storing timing information relating to a pressure control means such as an open/close valve, and means for decrementing the second register means as the cooking process continues for causing the second register means to reach zero slightly before the first register means reaches zero, and thus pressure in the cooking apparatus is released slightly before the cooking cycle is completed.

However, since pressure in the oil vat varies according to a kind and an amount of foods, there is a gap in a timing between time up and complete release of pressure in the oil vat if a cooking termination is monitored based on time. Therefore, a lid could be opened when there is extra remaining pressure in the oil vat.

In order to solve the above problem, an object of the present invention is to provide a pressure fryer capable of judging a termination of cooking in a safe state without fail regardless of a kind and an amount of foods.

SUMMARY OF THE INVENTION

A pressure fryer of a first aspect of the present invention includes a pressure detecting means for detecting the pressure in the oil vat and a controlling means for judging the termination of cooking when lowered pressure in the oil vat is detected by the pressure detecting means after the cooking timer finishes.

According to a second aspect of the present invention, in addition to the object of the first aspect, a pressure fryer has a configuration in which the pressure detecting means is a pressure switch which is turned ON at set pressure, and the controlling means is a means for detecting the lowered pressure by receiving an OFF signal of the pressure switch in order to confirm the lowered pressure easily without fail.

According to a third aspect of the present invention, in addition to the object of the second aspect, a pressure fryer has a configuration in which the pressure detecting means includes another pressure switch which is turned ON when pressure becomes higher than the set pressure, and the controlling means starts the cooking timer when it receives the ON signal of the pressure switch in order to start cooking in the best timing.

According to a fourth aspect of the present invention, in addition to the object of the first aspect, a pressure fryer has a configuration in which the pressure detecting means is a pressure sensor which detects pressure changes and the controlling means detects the lowered pressure by receiving a detected signal of the pressure sensor in order to confirm the lowered pressure more easily.

DETAILED DESCRIPTION OF THE PREFERRED EMBODIMENTS

Hereinafter, a preferred embodiment of the present invention will be described with reference to the accompanying drawings.

Figure 1:
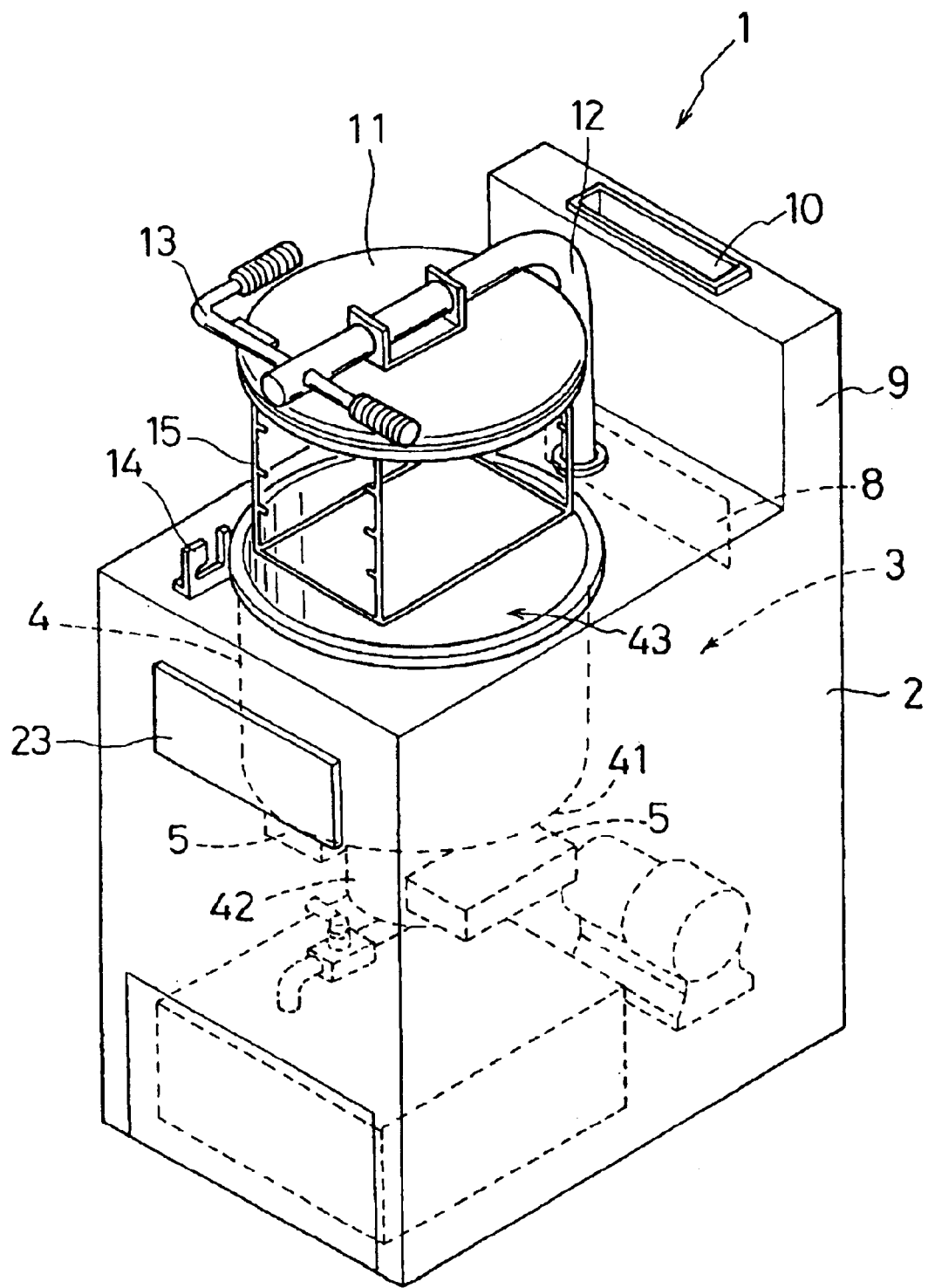
FIG. 1 is a perspective view of a pressure fryer.
Figure 2:
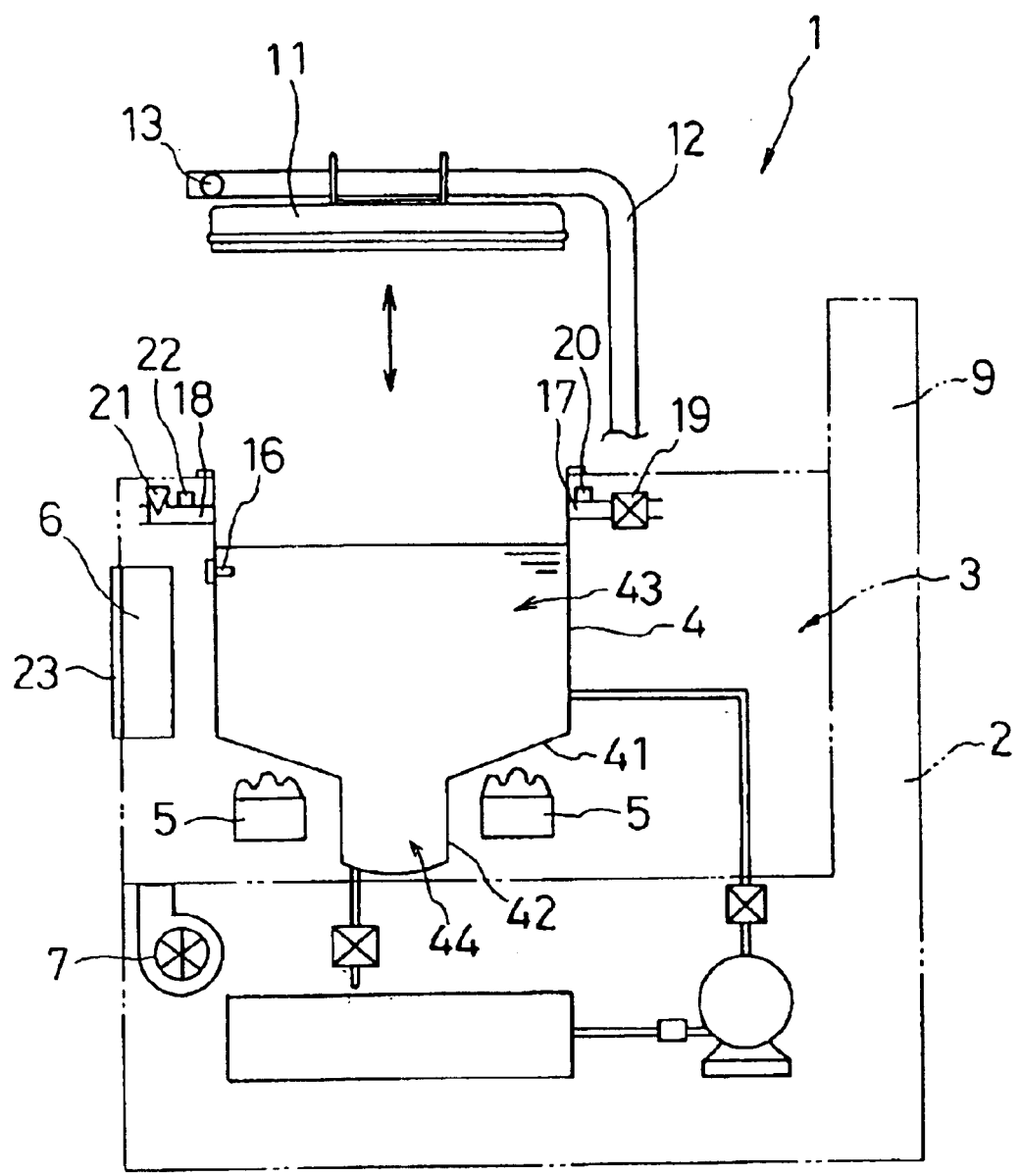
FIG. 2 is a schematic view of a pressure fryer.

FIG. 1 is a perspective view of a pressure fryer as an embodiment of the present invention, and FIG. 2 shows a schematic view thereof. A pressure fryer 1 has a box-shaped casing 2 which includes a combustion chamber 3. In the combustion chamber 3, an oil vat 4 for containing cooking oil which has an opening at the top thereof is provided. Under the oil vat 4, a pair of burners 5, 5 is provided as a heating means for heating the oil vat from the bottom. Each of the burners 5 is controlled their combustion ON/OFF by a burner controller 6 provided in the casing 2 as a controlling means. The number 7 indicates a blower for providing combustion air to the combustion chamber 3, and the burner controller 6 controls the blower as well. An exhaust vent 8 for combustion exhaust gas is provided at the upper rear of the combustion chamber 3. The exhaust vent 8 communicates with an exhaust chamber 10 having an opening at the top and formed in a rear wall 9 provided perpendicularly at the rear of the casing 2.

It should be noted that a cross sectional view of the oil vat 4 is a circle. The oil vat 4 has a bottom of two parts configuration which are a small diameter circle portion 42 protruding downward at the center and an inclined lower part 41, which is a mortar like shape, inclining lower toward the small diameter circle portion 42. Each of the burners 5, 5 is symmetrically disposed around the small diameter circle portion 42 to be able to heat the inclined lower part 41. Therefore, in the oil vat 4, there are a cooking zone 43 to be heated by the burners 5, 5 and a cold zone 44 disposed under the cooking zone 43 without being heated by the burners 5, 5. Fry residues of foods generated during cooking are introduced by the inclined lower part 41 to be collected in the cold zone 44. Because of this, the fry residues do not affect cooking in the cooking zone 43. As a result, a rapid temperature rise and an equalization of temperature distribution can be achieved in the cooking zone 43.

The reference number 11 denotes a lid supported by a support bar 12. The support bar 12 is provided perpendicularly and movably upward and downward at the rear (inner side) of the oil vat 4 in the casing 2. Further, the support bar 12 has an impetus at an upper limit position. When the lid 11 descends with the support bar 12, the lid 11 is inserted into the opening of the oil vat 4, to seal the oil vat 4. The reference number 13 denotes a lock lever capable of locking the lid 11 being engaged with a lock plate 14 on the side of casing 2 at the lower limit position of the lid 11. The reference number 15 denotes a metal basket which holds a plurality of metal gauze on which foods are disposed and is hung attachably to or detachably from the bottom of the lid 11. The metal basket 15 can be sunk into the cooking oil of the oil vat 4 at the lowest position of the lid 11.

A temperature detection sensor 16 is provided with the oil vat 4 to detect the temperature of the cooking oil, which is input into the burner controller 6. At the edge of the opening of the oil vat 4, two ducts 17, 18 for releasing air of the oil vat 4 are connected. One of the ducts 17 has a pressure valve 19 which is always opened as a pressure releasing means and a first pressure switch 20 disposed between the pressure valve 19 and the oil vat 4. The other duct 18 has a relief valve 21 and a second pressure switch 22 disposed between the relief valve 21 and the oil vat 4. The pressure valve 19 is an electromagnetic valve to be opened/closed under the control of the burner controller 6, and the relief valve 21 is automatically controlled by the operation of a plunger to release pressure at predetermined pressure. The first pressure switch 20 and the second pressure switch 22 are operated at each set pressure or above for inputting ON signal into the burner controller 6, and these pressure switches are known. The set pressure of the first pressure switch 20 is a high value suitable for pressure cooking, and the set pressure of the second pressure switch 22 is a low value which is safe enough to open the lid 11 when the oil vat 4 is sealed.

On the other hand, at the front of the casing 2, a cooking controller 23 electrically connected with the burner controller 6 for instructing the same to operate. The cooking controller 23 has a display portion (not shown), and an operating portion having a switch for starting cooking and an operating button where cooking menu can be selected and soon, and a buzzer as a notifying means. When a certain cooking menu is selected in the cooking controller 23 and the switch is turned ON for starting cooking, the burner controller 6 monitors the cooking oil temperature obtained from the temperature sensor 16 according to a set temperature and a set cooking timer for the selected cooking menu. Further, the cooking controller 23 carries out an ON/OFF control so that the burners 5, 5 operate intermittently for a predetermined period to heat the cooking oil of the oil vat 4.

Figure 3:
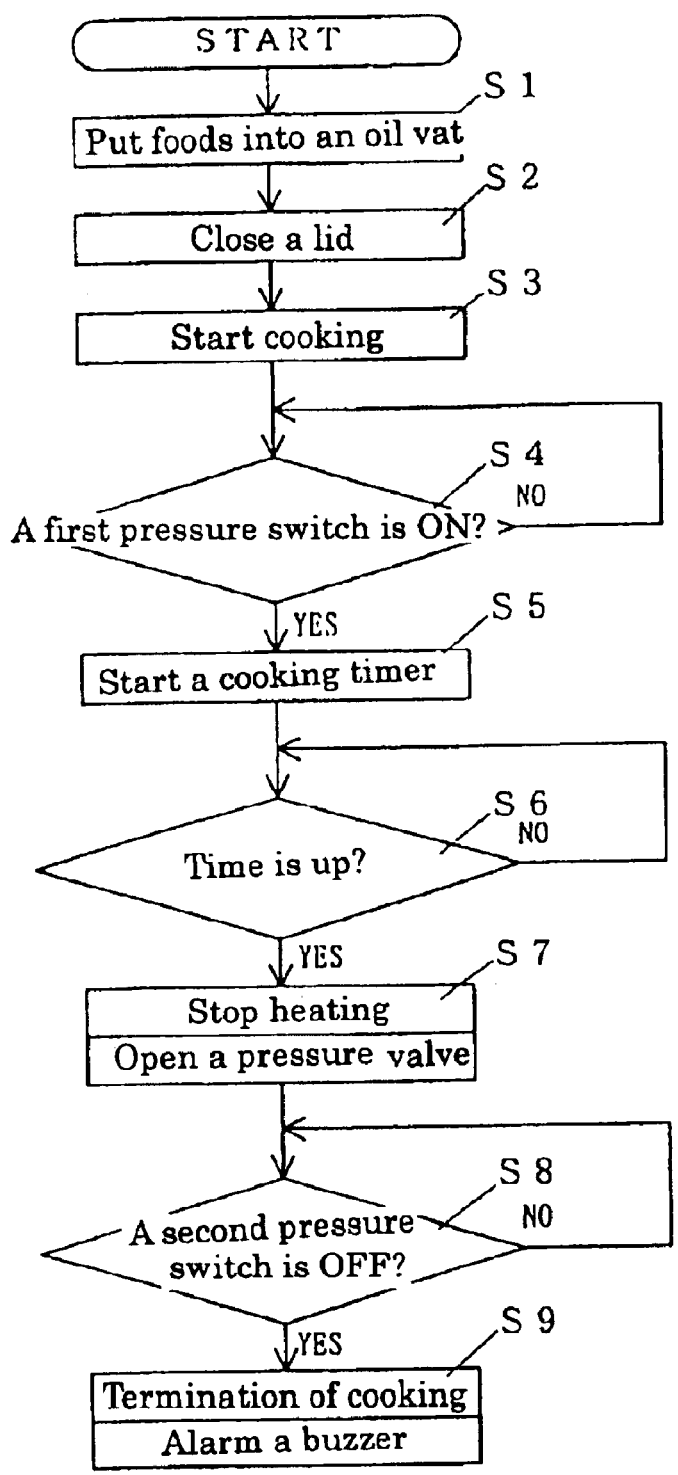
FIG. 3 is a flowchart of a control of cooking with heat and pressure.

In a fryer 1 having the above configuration, a control of cooking with heat and pressure by the burner controller 6 will be explained using a flowchart of FIG. 3.

First, foods are put into the oil vat 4 at S1 and the lid 11 is descended to be inserted into an opening of the oil vat 4 and locked at the lowest position at S2. Next at S3 a cooking menu is selected in the cooking controller 23 and a switch is turned ON for starting cooking. Then, the burner controller 6 ignites the burners 5, 5 for heating the oil vat 4 and the pressure valve 19 is closed, whereby pressure in the oil vat 4 increases by virtue of steam generated from foods along with heating. At S4 it is judged whether the first pressure switch 20 is turned ON, that is, whether pressure in the oil vat 4 reaches set pressure suitable for pressure cooking. When it is confirmed that the pressure reaches the set pressure at S5, a cooking timer according to the selected cooking menu is started.

When the cooking timer finishes at S6, the burner controller 6 stops heating with the burners 5, 5 at S7 and the pressure valve 19 is opened so that the pressured air in the oil vat 4 can be released. Along with the release by the pressure valve 19, when pressure in the oil vat 4 reaches a low value which is safe enough to open the lid 11 from the oil vat 4, the second pressure switch 22 with low set pressure is turned OFF. When it is confirmed that the second pressure switch 22 is turned OFF at S8, the cooking controller 23 alarms a buzzer to notify termination of the cooking at S9. Besides the buzzer, a chime, a voice, a display of a display portion and a blink by lights may be used for this notification and combination of the above is also acceptable.

As described above, according to the fryer 1 having the above configuration, by adopting the second pressure switch 22 as a pressure detecting means, the burner controller 6 judges termination of cooking when lowered pressure in the oil vat 4 is confirmed after the cooking timer finishes. As a result, termination of cooking in a safe state can be notified without fail regardless of a kind or an amount of foods. Therefore, gushing out of steam or oil smoke in opening of the lid can be completely prevented and safe utilization can be achieved.

Particularly, the second pressure switch 22 is provided as a pressure detecting means and the burner controller 6 has a configuration where the lowered pressure is detected by an OFF signal of the second pressure switch 22. Whereby, the lowered pressure can be confirmed easily without fail.

Particularly, the first pressure switch 20 is added as a pressure detecting means and the burner controller 6 has a configuration where the cooking timer is started after receiving an ON signal of the first pressure switch 20. Whereby, starting cooking can be conducted in the best timing, and preferable cooking is feasible.

In the above embodiment, only a single second pressure switch is used as a pressure detecting means, but modifications are acceptable. For example, a plurality of the second pressure switches can be provided to detect the lowered pressure only when it is confirmed that a predetermined number of second switches are turned OFF. As a result, reliability of detection of the lowered pressure can be improved. It should be noted that such modifications are applied to the first pressure switches.

Further, instead of the pressure switches, a pressure sensor for detecting the pressure changes may be used as a pressure detecting means. By utilizing the pressure sensor, a single pressure sensor can deal with various set pressure having either high or low pressure, whereby the lowered pressure can be confirmed with a simpler configuration.

According to a first aspect of the present invention, termination of cooking is judged after confirming the lowered pressure in the oil vat. As a result, termination of cooking in a safe state can be notified without fail regardless of a kind or an amount of foods. Therefore, gushing of steam or oil smoke when the lid is opened can be completely prevented and safe utilization can be achieved.

According to a second aspect of the present invention, in addition to effects of the first aspect, a pressure detecting means is a pressure switch which is turned ON at set pressure, and a controlling means detects the lowered pressure by receiving an OFF signal of the pressure switch. As a result, the lowered pressure can be easily confirmed without fail.

According to a third aspect of the present invention, in addition to the effect of the second aspect, the pressure detecting means includes another pressure switch which is turned ON when pressure becomes higher than the set pressure, and the controlling means starts the cooking timer when it receives the ON signal of the pressure switch. Whereby, cooking can be started in the best timing, which enables a preferable cooking.

According to a fourth aspect of the present invention, in addition to the effect of the first aspect, the pressure detecting means is a pressure sensor which detects pressure changes and the controlling means detects the lowered pressure by receiving a detected signal of the pressure sensor. Whereby, a single pressure sensor can deal with various set pressure having either high or low pressure, whereby the lowered pressure can be confirmed with a simpler configuration.

What is claimed is:

1. A pressure fryer comprising:

an oil vat for containing cooking oil;

a heating means for heating the oil vat;

a lid which is capable of closing the oil vat when the heating means is operated;

a pressure releasing means for releasing pressure in the oil vat, and a controlling means for controlling the operation of the heating means and the pressure releasing means, wherein the controlling means operates the heating means according to a predetermined cooking timer and the pressure in the oil vat is released by the pressure releasing means when the cooking timer finishes, wherein a pressure detecting means is provided for detecting the pressure in the oil vat and the controlling means is a means for judging the termination of cooking when lowered pressure in the oil vat is detected by the pressure detecting means after the cooking timer finishes.

2. A pressure fryer as claimed in claim 1, wherein the pressure detecting means is a pressure switch which is turned ON at set pressure, and the controlling means is a means for detecting lowered pressure by receiving an OFF signal of the pressure switch.

3. A pressure fryer as claimed in claim 2, wherein the pressure detecting means includes another pressure switch which is turned ON when pressure becomes higher than the set pressure, and the controlling means starts the cooking timer when it receives the ON signal of the pressure switch.

4. A pressure as claimed in claim 1, wherein the pressure detecting means is a pressure sensor which detects pressure changes and controlling means detects lowered pressure by receiving a detected signal of the pressure sensor.

* * * * *